March 19, 1946.  J. M. WILSON  2,397,068
PLANETARY MANUAL CONTROL MECHANISM
Filed Oct. 14, 1942
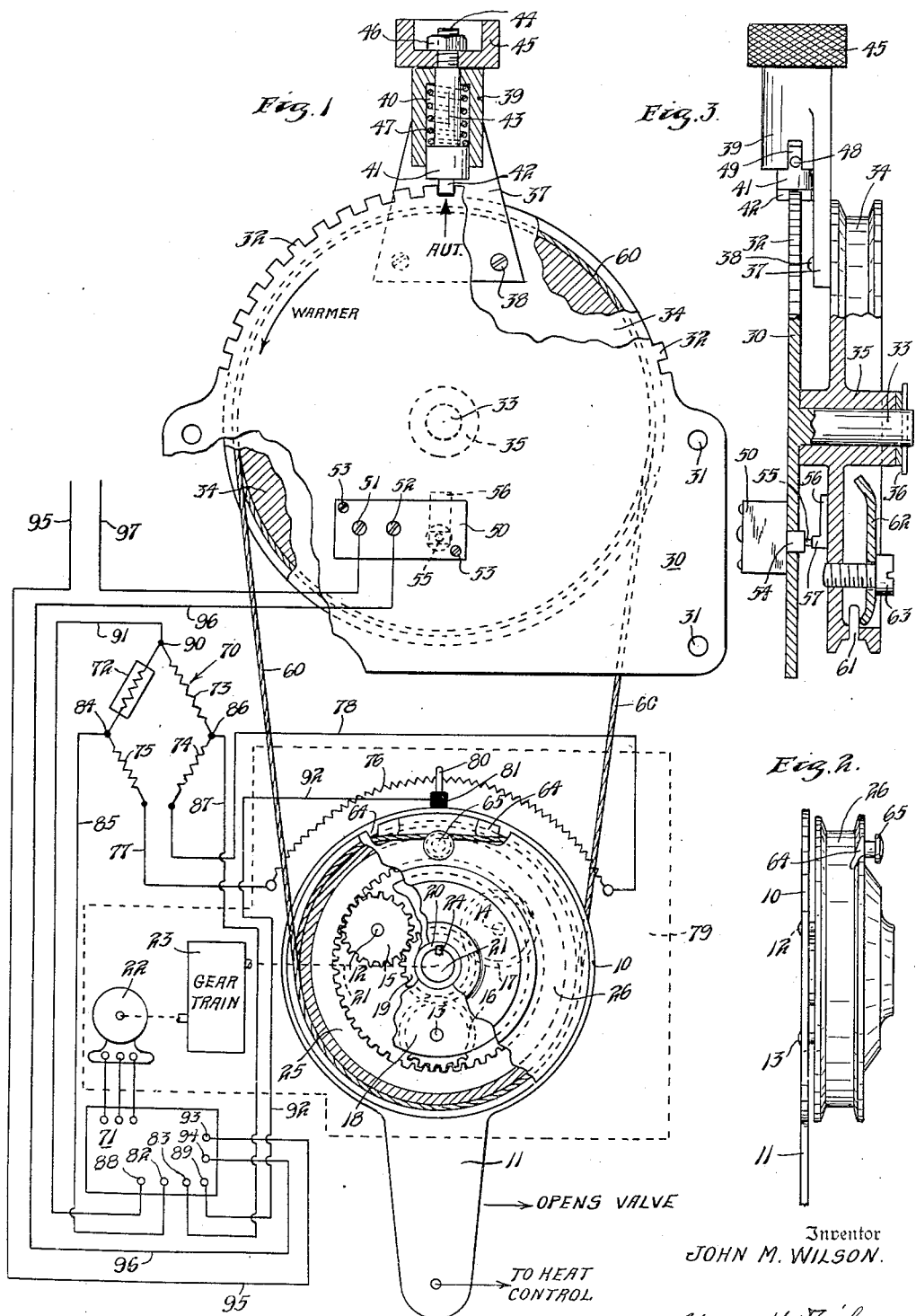
Inventor
JOHN M. WILSON.
BY George H. Fisher
Attorney Patented Mar. 19, 1946

2,397,068

UNITED STATES PATENT OFFICE 2,397,068

PLANETARY MANUAL CONTROL MECHANISM

John M. Wilson, Minneapolis, Minn., assignor to Minneapolis-Honeywell Regulator Company, Minneapolis, Minn., a corporation of Delaware Application October 14, 1942, Serial No. 461,970

4 Claims. (Cl. 74—407)

The present invention relates to a manual control mechanism by means of which a device to be positioned and which is normally positioned by a power means can be manually positioned independently of the power means.

It is an object of the present invention to provide a manual control mechanism of this type in which the device to be positioned, the power means and the manual operating means are permanently and continuously mechanically interconnected, thereby eliminating the use of clutches, latching mechanisms and the like.

More specifically, the present invention provides an arrangement utilizing a planetary gear mechanism, one portion of which is normally maintained stationary by the manual control apparatus so that the device to be positioned is driven by the power means. Further, when it is desired to position the device manually, the power means becomes the stationary portion of the gear system so that movements of the manual operator produce corresponding movements of the device to be positioned.

Other objects will become apparent upon a reading of the detailed description and by reference to the accompanying drawing in which:

Fig. 1 is a showing of the complete system of my invention with certain parts broken away and others in section to more clearly show the structure thereof, Fig. 2 is a side view of that part of the apparatus shown in the lower part of Fig. 1, and Fig. 3 is a side view of the upper portion of the apparatus shown in Fig. 1 with certain parts in section and others broken away to more clearly illustrate the structure thereof.

Referring to Figs. 1 and 2, the planetary mechanism comprises a substantially circular plate 10 having an arm 11 extending therefrom. The plate 10 and arm 11 constitute the device or member which is to be positioned or the driven arm of the apparatus. This driven arm 11 may be utilized to control any desired apparatus and it is herein contemplated that the arm 11 will be connected to any suitable heat control mechanism, such for example for use in heating the cabin of an aircraft. Three stud shafts 12, 13 and 14 are secured to the plate 10 at equally spaced points on an imaginary circle having the same center as the periphery of the circular plate 10. Mounted upon the stud shafts 12, 13 and 14 for rotation are planet pinions 15, 16 and 17. The stud shafts 12, 13 and 14 extend entirely through the planet pinions 15, 16 and 17 and through a plate 18 which serves to secure the front ends of the stud shafts 12, 13 and 14 as viewed in Fig. 1. Also located between the plates 10 and 18 and meshing with each of the planet pinions 15, 16 and 17 is a sun pinion 19. The sun pinion 19 is secured to a tubular bearing member 20 which extends through the plate 18 and terminates at some distance in front of it. The interior of this tubular bearing member 20 is secured to a final driven shaft 21 which is connected to a reversible electric motor 22 of the split phase type through a suitable reducing gear train 23. The tubular member 20 may be secured to the shaft 21 in any desired manner and is herein shown as keyed thereto at 24. Cooperating with the outer portions of each of the planet pinions 15, 16 and 17 is an internal gear 25. This internal gear 25 may be made integral with or be fixedly secured to a cable drum 26.

The cable drum 26 may of itself constitute the manual operator. However, I prefer to have the manual operator capable of being located at a point remote from the planetary mechanism. To this end, I provide a remote manual operator which is connected to the cable drum 26. Referring now to the upper part of Fig. 1 and to Fig. 3, the remote manual mechanism includes a mounting plate 30 having mounting holes 31 therein by means of which the plate 31 may be secured to any desired part of the aircraft cabin so that the manual operating means can be conveniently operated by the pilot. The lower half of the mounting plate 30 is substantially rectangular in form whereas the upper half thereof is in the form of a semi-circle having teeth or notches 32 formed in the periphery thereof. Secured to and extending backwardly from the mounting plate 30 is a stud shaft 33 upon which a second cable drum is mounted. This cable drum comprises the drum portion proper 34 and the bearing member or hub 35 which rotates upon the stud shaft 33. This hub 35 is retained upon the stud shaft 33 in any suitable manner, such as by the cotter pin 36.

A plate 37 is secured to the cable drum 34 by means of screws 38. Formed integral with the plate 37 is a cylindrical latch housing 39 provided with an internal bore 40. Closely fitting and slidably mounted within the bore 40 is a cylindrical member 41 having a latch portion 42 adapted to engage the notches formed by the teeth 32. Formed integrally with the cylindrical member 41 and extending upwardly therefrom is a shank 43 terminating in a screw-threaded portion 44 to which an operating knob 45 is secured by means of a nut 46. A spring 47 mounted within the bore 30 has its upper end bearing against the under side of the housing 39 and its lower end bearing against the upper side of the cylindrical member 31, whereby the latching portion 42 is biased downwardly. As a result, the cable drum 34 is normally latched in a stationary position. The position in which the cable drum 34 is shown latched is the "automatic" position as indicated on the plate 39 and as will appear hereinafter.

When it is desired to rotate the cable drum 34 in either direction, the operating knob 45 is pulled upwardly against the bias of spring 47 so as to remove the latching portion 42 from one of the notches between the teeth 32. Then, while the operating knob 45 is still held in its upper position, the whole assembly including the cable drum 34 may be rotated in either direction through substantially a quarter of a turn. If it is then desired to lock the cable drum 34 in some new position, the manual operating knob 45 is released whereupon the latching portion 42 enters a different notch between a pair of teeth 32 and the drum 34 is thus locked in its new position. A pin 48 extends horizontally from cylindrical member 31 through a notch 49 in the housing 39 to prevent turning of the latching portion 42 so that it cannot become crosswise of the teeth 32.

For reasons which will appear hereinafter, it is desirable to break an electrical circuit upon movement of the cable drum 34 out of its "automatic" position in which it is shown. To this end, a snap switch 50 having terminals 51 and 52 is secured to the mounting plate 30 by means of screws 53. This snap switch has a cylindrical extension 54 which extends through a suitable opening in the mounting plate 30. The snap switch 50 further includes an operating pin or push button 55 which extends through and projects beyond the cylindrical portion 54. A switch actuating member 56 having a push button operating portion 57 is secured to the cable drum 34 in such position that it is engaged with the push button 55 and holds it in its innermost position when the cable drum 34 is in the "automatic" position as shown. However, upon slight movement of the cable drum in either direction away from the "automatic" position, the push button actuating extension 57 will move out from under the push button 55 whereupon the push button 55 automatically, through a biasing means contained within the switch 50, moves to its outer position. This switch 50 may be of any suitable type wherein a circuit is opened whenever the push button is in its outer position to which it is biased and in which such circuit is closed when the push button is held in its innermost position as it is with the parts in the position shown in Figs. 1 and 3. This switch 50 may as well take the form disclosed in the co-pending application of Albert E. Baak, Serial No. 307,991, filed December 7, 1939, Patent No. 2,318,734, granted May 11, 1943.

The cable drums 34 and 26 are interconnected by means of a cable 60. For this purpose, the cable drum 34 is provided with a slot 61 and a cable clamping plate 62 which can be held in clamping position by means of a screw 63. One end of the cable is clamped by means of the clamping plate 62. The cable is then wound about the cable drum 34 for substantially a complete turn after which it is wound completely about the cable drum 26 and then is again wound about the cable drum 34 the greater portion of a turn and the second end is then clamped by the clamping member 62. In order to prevent slippage of the cable on the cable drum 26, the cable drum is provided with a pair of slots 64 and a pin 65. When the cable is wound about the drum 26, it is brought out of one of the slots 64, wound around the pin 65, and then passes through the other slot 64 back onto the cable drum 26.

It will thus be seen that the cable drum 26 to which the internal gear 25 is secured is normally held stationary by the latching mechanism for the cable drum 34. However, the cable drum 34 may be rotated to a limited extent in each direction away from the "automatic" position and such rotative movement will be transmitted to the cable drum 26. The operating arm or driven arm 11 is capable of being rotated through 120 degrees. The cable drum 34 is capable of being rotated 75 degrees either way from its "automatic" position. Seventy-five degrees rotation of cable drum 34 results in 120 degrees rotation of cable drum 26 because of the relative sizes of these drums, as is generally shown in the drawing.

The power means constituting the split phase motor 22 may be controlled in any desired manner. I herein disclose an automatic control system of the temperature responsive type that includes a resistance bridge circuit 70 and an electronic amplifier 71. The bridge circuit 70 includes in one arm a temperature responsive resistance 72 of usual construction the resistance of which increases upon temperature rise. This temperature resistance 72 may respond, for example, to the temperature in an aircraft cabin. The three other arms of the bridge circuit include fixed resistances 73, 74 and 75. Those arms which include the fixed resistances 74 and 75 additionally include a variable amount of resistance of a balancing or follow-up potentiometer. This potentiometer includes a balancing resistance 76, the left-hand end of which is secured or connected to the lower end of fixed resistance 75 by a wire 77 whereas its right-hand end is connected to the lower end of fixed resistance 74 by a wire 78. The balancing resistance 76 may be suitably carried by this housing so that it is stationary and does not move. Cooperating with this balancing resistance 76 is a slider arm 80 which moves in accordance with the movement of plate 10 or driven arm 11. For convenience, the slider arm 80 has therefore been shown as attached to the plate 10 through a piece of insulating material 81. In actual practice, the motor 22, gear train 23, and planetary mechanism may be conveniently mounted in a housing generally indicated by the dotted line 79.

The electronic amplifier 71 includes a pair of terminals 82 and 83 for supplying power to the bridge 70. Terminal 82 is connected to a bridge input terminal 84 by a wire 85. The bridge input terminal 84 comprises the junction of those arms which include the temperature sensitive resistance 72 and the fixed resistance 75. Similarly, amplifier terminal 83 is connected to a bridge input terminal 86 by a wire 87. The bridge input terminal 86 comprises the junction of those arms of the bridge which includes the fixed resistances 73 and 74. The amplifier 71 further includes a pair of amplifier input terminals 88 and 89. Terminal 88 is connected to a bridge output terminal 90 by means of a wire 91. This terminal 90 constitutes the junction of those arms of the bridge circuit which include the temperature sensitive resistance 72 and the fixed resistance 73. The other terminal 89 of the amplifier is connected to the slider arm 80 by means of a wire 92. In addition, the electronic amplifier 71 includes a pair of incoming power terminals 93 and 94. Power terminal 93 is directly connected to one wire 95 of any suitable source of alternating current. Terminal 94 is connected by means of a wire 96 to the terminal 52 of switch 50. The terminal 51 thereof is connected to the other wire 97 of the alternating source of power.

The resistance bridge 70, the electronic amplifier 71 and the manner in which they are interconnected may take any of the forms known in the art but I preferably utilize a system of the type disclosed in the co-pending application of Albert P. Upton, Serial No. 437,561, filed April 3, 1942. In the type of system disclosed in said Upton application, the split phase motor 22 is provided with the usual two windings. One of these windings is constantly energized. The other winding is deenergized when the bridge circuit is unbalanced. However, upon unbalance of the bridge circuit in one direction, the second winding of the split phase motor is energized with a current which has a phase leading that of the constantly energized winding whereupon the motor rotates in one direction. On the other hand, when the bridge is unbalanced in the opposite direction, the second winding of the split phase motor is supplied with a current which has a phase which lags that of the constantly energized winding with the result that the motor rotates in the opposite direction.

*Automatic operation*

With the parts in the postion shown, the manual operator is in the "automatic" position with the result that the push button 55 of the switch 50 is in its innermost position and a circuit is closed between terminals 51 and 52 of the switch 50. Therefore, power is being supplied to the electronic amplifier 71. Also, with the parts in the position shown, the temperature of the aircraft cabin is at an intermediate value and the heat control or valve operating arm 11 is in a position intermediate its possible extreme positions. Similarly, the slider arm 80 is at the center of the balancing resistance 76. Under such conditions, the bridge 70 is in balance and the second winding of the split phase motor 22 is deenergized so that the motor is stationary.

Now let us assume that the temperature in the aircraft cabin rises. Under such conditions the resistance of the temperature sensitive resistance 72 increases and the bridge 70 is unbalanced. As a result, the electronic amplifier 71 supplies the second winding of the split phase motor 22 with a current out of phase with that of the constantly energized winding and in such direction that the sun pinion 19 is driven in a clockwise direction. Since the internal gear 25 is being held stationary by the remotely located manual mechanism, the planet pinions 15, 16 and 17 in rotating in a counter-clockwise direction about their respective stud shafts 12, 13 and 14, will cause the plate 10 upon which such stud shafts are mounted to rotate in a clockwise direction. As a result, the arm 11 likewise moves in a clockwise direction so as to move the valve or heat control apparatus towards closed position to reduce the amount of heat supplied to the aircraft cabin. Such movement of the plate 10 causes the slider arm 80 to move towards the right-hand end of balancing resistance 76. When sufficient movement has taken place, the bridge circuit will be rebalanced. When this occurs, the electronic amplifier 71 will deenergize the second winding of the split phase motor 22 whereupon rotation of the sun pinion 19 will cease. Likewise, the plate 10 will cease its movement. If there should be further rises in the cabin temperature, corresponding clockwise movements of the driven or control arm 11 will result.

On the other hand, if the temperature within the aircraft cabin should fall, the resistance of temperature sensitive resistance 72 decreases. This unbalances the bridge 70 in the opposite direction. As a result, the electronic amplifier 71 energizes the second winding of motor 22 with a current having an opposite phase than occurred upon temperature rise, so that the sun pinion 19 is rotated in a counter-clockwise direction. Inasmuch as the internal gear 25 is still being held stationary, this counter-clockwise rotation of the sun pinion 19 results in counter-clockwise rotation of plate 10 and control arm 11. This moves the heat control valve towards open position to supply additional heat to the cabin and at the same time causes the slider arm 80 to move towards the left-hand end of balancing resistance 76. When sufficient counter-clockwise movement of the plate 10 and therefore the control arm 11 and the slider arm 80 has taken place, the bridge 70 will be rebalanced whereupon the electronic amplifier 71 will deenergize the second winding of the motor 22 and further counter-clockwise rotation of the sun pinion 19 will cease. Likewise, the plate 10 and accompanying parts also cease their movements.

In this manner, so long as the manual operator is in the "automatic" position so that the internal gear 25 is held stationary, the arm 11 will be positioned in accordance with the movements of the motor 22, which in this instance are in accordance with temperature fluctuations at temperature sensitive resistance 72 which responds to the temperature of the interior of the aircraft.

*Manual operation*

It may be desired to take over manual positioning of the arm 11 at times. This manual positioning may be desired when the electrical system is in operative condition or may be desired when for some reason or other the electrical system is inoperative.

Let us assume it is desired to increase the temperature in the aircraft cabin manually. Under such conditions, the manual knob 45 is lifted and the manual operator is moved in a counter-clockwise direction (in the direction of the arrow marked "warmer"). The initial movement of the manual operator causes the button actuating member 57 to move away from the push button 55, whereupon it moves outwardly and breaks the circuit between terminals 51 and 52 of the switch 50. Breaking of this circuit interrupts the power supplied to the electronic amplifier 71 so that the motor 22 remains stationary irrespective of whether or not the electrical system is otherwise in operative condition. The counter-clockwise movement of the manual operator is transmitted to the cable drum 26 through the cable 60 so that the cable drum 26 and associated internal gear 25 likewise move in a counter-clockwise direction. At this time, the sun pinion 19 is of course stationary due both to the connected gear train and to the fact that the motor 22 cannot be energized. This counter-clockwise rotation of the internal gear 25, while the sun pinion 19 is held stationary, results in counter-clockwise rotation of the plate 10 and integral operating arm 11. Such movement of the operating arm 11 opens the heat controlling valve to a greater extent thereby supplying more heat to the aircraft cabin. Such movement of the plate 10 also results in movement of the slider arm 80 towards the left-hand end of balancing resistance 76. However, since all power has been removed from the electronic amplifier 71 by means of opening of the switch 60, such operation of the balancing potentiometer cannot cause any operation of the motor 22.

On the other hand, if it is desired to manually decrease the temperature in the airplane cabin, the manual operator 46 is moved upwardly and the manual mechanism rotated in a clockwise direction. Here again, upon initial movement of the operator in clockwise direction away from the "automatic" position, the push button operating extension 57 moves away from push button 56 so that the switch 60 again opens cutting off all power from the electronic amplifier 71. The sun pinion 18 is therefore again maintained stationary. The clockwise movement of the manual operator is transmitted to the cable drum 20 and internal gear 25 by the cable 30. Such clockwise rotation of the internal gear 25, while the sun pinion 18 is held stationary, results in clockwise rotation of plate 10 and the integral operating arm 11. As a result, the heat controlling valve is moved towards closed position so as to reduce the heat in the aircraft cabin. This movement of plate 10 of course starts movement of slider arm 80 along resistance 76 towards its right-hand end. Again however, such movement is ineffective to cause motor operation since the power supply to the amplifier 71 has been discontinued by the switch 60.

In this manner, manual operation of the operating arm 11 can be obtained at any time the pilot wishes. Furthermore, by the provision of switch 60, the power means is rendered inoperative whenever manual control of the apparatus is utilized.

There is of course no way of knowing in what position the operating arm 11 will be in at the time it is desired to take over operation of the apparatus manually. The arm 11 might be in either of its extreme positions or in some intermediate position. For this reason, the manual operating mechanism is provided with sufficient movement on each side of the "automatic" position so that the arm 11 may be moved throughout its complete range of movements by the manual operator irrespective of the position of the arm 11 at the time the manual control is utilized. In other words, the manual operator has twice the necessary movement to move arm 11 throughout its full range. If the arm 11 should be in the middle position shown at the time manual operation is utilized, then only half the total movements of the manual mechanism on each side of its "automatic" position would be utilized. If the arm 11, however, should be in one of its extreme positions when manual operation is desired then the full movement of the manual operator from "automatic" position in one direction would be utilized but its movement in the other direction would not be utilized.

As a result of this arrangement, I have provided for manual operation of the device to be positioned entirely independently of the power means. Further, I have accomplished this through permanent mechanical connections as distinguished from the use of clutches, latches, and the like, but nevertheless can give the device to be positioned a complete movement throughout its range of movement by the manual apparatus irrespective of the position of the device to be positioned at the time manual control is taken over.

It will be obvious that in its broader aspects, it is immaterial as to the type of power means used or the manner in which it is controlled. It will likewise be obvious that other changes may be made in my invention without departing from the spirit thereof, and I therefore intend to be limited only by the scope of the claims appended hereto.

I claim as my invention:

1. In combination, a rotatable member to be positioned, power means for positioning said member, gear means permanently interconnecting said member to be positioned and said power means and including a gear member which when held stationary causes movement of said power means to be transmitted to said member to be positioned, rotation of said gear member while said power means is stationary causing movement of said member to be positioned, pivoted manual means permanently connected to said gear member for rotating the same, said manual means having a normal position and being movable in a single plane in either direction out of said normal position, and means for rendering said power means inoperative associated with said manual means and operated upon movement of said manual means out of its normal position, whereby movement of said manual means in said single plane out of its normal position in either direction renders said power means inoperative and immediately causes movement of said member to be positioned.

2. In combination, a rotatable member to be positioned, electrical means for positioning said member, gear means permanently interconnecting said member to be positioned and said electrical means and including a gear member which when held stationary causes movement of said electrical means to be transmitted to said member to be positioned, rotation of said gear member while said electrical means is stationary causing movement of said member to be positioned, pivoted manual means permanently connected to said gear member for rotating the same and having a normal stationary position, and switch means for rendering said electrical means inoperative associated with said manual means and operated upon movement of said manual means out of its normal position, whereby movement of said manual means in said single plane out of its normal position in either direction renders said electrical means inoperative and immediately causes movement of said member to be positioned.

3. In combination, a rotatable member to be positioned, electrical means for positioning said member, gear means permanently interconnecting said member to be positioned and said electrical means and including a gear member which when held stationary causes movement of said electrical means to be transmitted to said member to be positioned, rotation of said gear member while said electrical means is stationary causing movement of said member to be positioned, a remotely located manual lever pivoted for movement in a single plane permanently connected to said gear member for rotating the same, a stationary notched sector plate adjacent said manual lever, means on said lever for engaging said notches whereby the manual lever is held stationary, and switch means for rendering said electrical means inoperative associated with said manual lever and operated upon movement of said manual lever out of a central position on said selector plate whereby movement of said manual lever out of its central position renders said electrical means inoperative and immediately causes movement of said member to be positioned.

4. In combination, a rotatable member to be positioned, planet pinions pivotally carried thereby at points equally spaced from the axis of rotation of said rotatable member, a sun pinion rotatably mounted within and constantly meshing with said planet pinions, electrical means permanently connected to said sun pinion for driving the same, an internal gear surrounding and permanently meshing with said planet pinions, a pivoted manual means permanently connected to said internal gear for manually rotating the same, said pivoted manual means having a normal position and being movable about its pivot in a single plane in either direction away from its normal position, and switch means for rendering said electrical means inoperative, associated with said manual means and operated upon movement thereof out of its normal position in either direction whereby movement of said manual means in a single direction out of its normal position renders said electrical means inoperative and immediately rotates said member to be positioned.

JOHN M. WILSON.